J. H. LEITCH.
FRICTION DRIVE FOR FANS.
APPLICATION FILED DEC. 5, 1921.
1,425,870.
Patented Aug. 15, 1922.
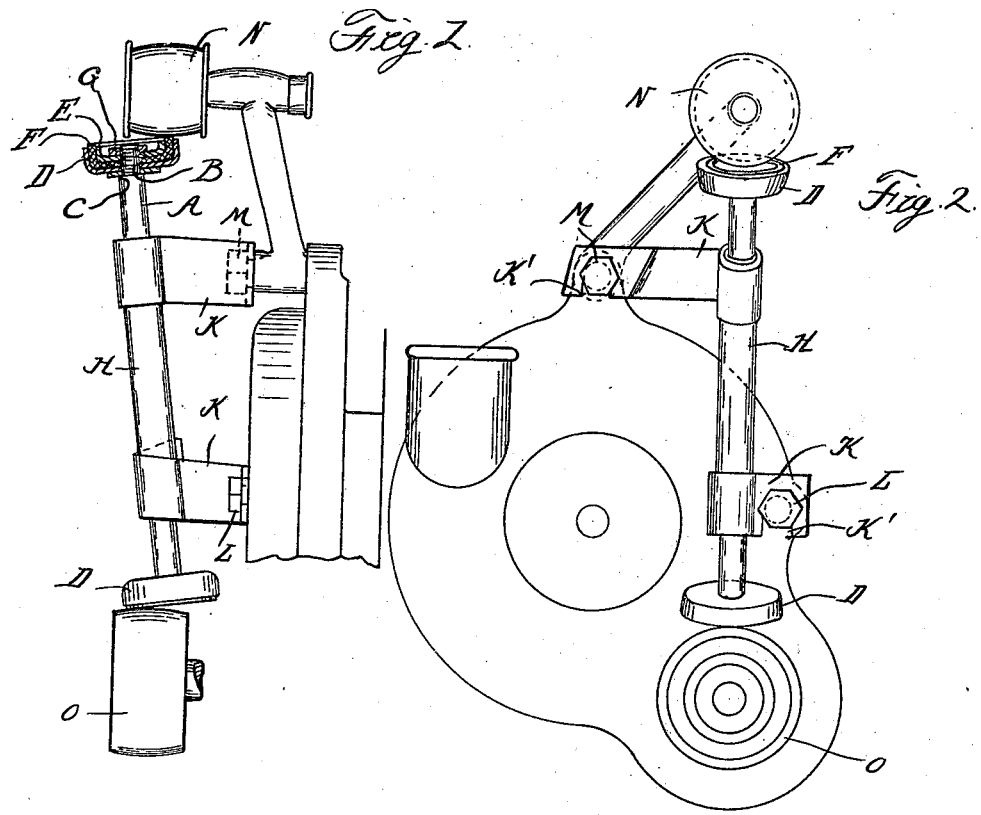
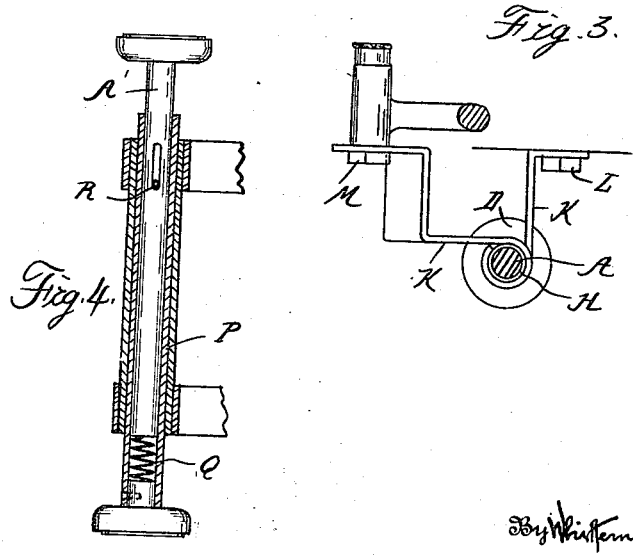
Inventor
John H. Leitch
By Whittemore, Hulbert, Whittemore & Belknap
Attorneys

UNITED STATES PATENT OFFICE.

JOHN H. LEITCH, OF DETROIT, MICHIGAN, ASSIGNOR TO AUTO ACCESSORIES MFG. CO., OF DETROIT, MICHIGAN, A CORPORATION OF MICHIGAN.

FRICTION DRIVE FOR FANS.

1,425,870.

Specification of Letters Patent.   Patented Aug. 15, 1922.

Application filed December 5, 1921. Serial No. 519,899.

*To all whom it may concern:*

Be it known that I, JOHN H. LEITCH, a citizen of the United States of America, residing at Detroit, in the county of Wayne and State of Michigan, have invented certain new and useful Improvements in Friction Drives for Fans, of which the following is a specification, reference being had therein to the accompanying drawings.

The invention relates to fans for use in connection with radiators of internal combustion engines and it is the object of the invention to provide a friction drive for the fan, thereby avoiding difficulties incident to the use of a pulley and belt drive. It is a further object to obtain a construction which is applicable to engines designed for using a belt and pulley drive and, further, to obtain an exceedingly simple and inexpensive construction. With these objects in view the invention consists in the construction as hereinafter set forth.

In the drawings:

Figure 1 is a sectional side elevation of my improvement as applied;

Figure 2 is a front elevation thereof;

Figure 3 is a horizontal section showing the manner of mounting the attachment;

Figure 4 is a longitudinal section through a modified construction.

As specifically shown, my device is designed for use as a replacement for a belt connection on Ford cars, but it is obvious that it is also applicable to other constructions.

In detail, A is a shaft, preferably a piece of cold-rolled steel having its opposite ends reduced and threaded at B, leaving shoulders C. D are pressed sheet metal cups engaging the shoulders C, and E are similar cups of smaller diameter between which and the outer cups is arranged a cup F of friction material. All of these parts are clamped to each other by nuts G on the threaded portion of the spindle. H is a tube sleeved upon the shaft A between the cups on opposite ends thereof, and K are brackets secured to the tube H and located to engage securing bolts such as L and M on the engine casing. Preferably, the bolt L is one of the bolts for securing the cover of the timing gear housing and the bolt M is that which secures the fan bracket. The brackets K have foot portions which are slotted at K' to engage said bolts.

In use, to apply the replacement to the car, the belt is removed and the bolts M and L loosened so that the brackets K may be engaged therewith. These brackets are so fashioned that the shaft A will be held in oblique position, as indicated in Figure 1. This will hold the inner edge of the friction cup at the opposite end of the shaft against the fan pulley N and the outer edge of the lower friction cup against the drive pulley O, which drives the pulleys in the same direction. When the bolts are tightened, the parts will be held in this position and will consequently transmit the rotation of the pulley O to the pulley N.

In the modified construction shown in Figure 4, instead of mounting both friction cups upon a single shaft, a telescopic shaft being used consisting of a tubular portion P, which surrounds the solid portion A' and which carries one of the friction cups, a spring Q is arranged between the end of the solid shaft and the end of the tubular shaft to furnish the necessary pressure for the friction cups against the pulleys. Also, a cotter pin R, or equivalent device, is used for transmiting the torque from the solid shaft to the tubular shaft.

What I claim as my invention is:

1. In an engine, the combination with a fan pulley, a drive pulley therefor, of a shaft arranged obliquely between said pulleys, friction wheels upon opposite ends of said shaft having marginal contact with respective pulleys, and a bearing for supporting said shaft secured to the engine casing.

2. The combination with an engine having a fan pulley and a drive pulley therefor, a replacement drive connection between said pulleys comprising a shaft, cup-shaped friction wheels mounted on opposite ends of said shaft, and a bearing for securing said shaft to the engine casing to be arranged obliquely between said pulleys with the marginal portions of said friction cups in contact with the respective pulleys.

3. The combination with an engine having a fan pulley and a drive pulley therefor, of a replacement drive connection therebetween comprising a shaft having reduced end portions forming shoulders, metallic cups secured to said end portions and bearing against said shoulders, friction cups mounted in said metallic cups, a bearing for said shaft adapted to be secured to the engine casing and holding said shaft in inclined position with marginal portions of said friction cups respectively in contact with said pulleys.

4. The combination with an engine having a fan pulley and a drive pulley therefor, of a replacement drive therebetween comprising a shaft, a tube sleeved on said shaft, cupped friction wheels mounted on the opposite ends of said shaft, a pair of brackets secured to said sleeve and engageable with bolts on said engine casing, said brackets being fashioned to hold said shaft in inclined position with the marginal portions of said friction cups on diametrically opposite sides of said shaft in friction contact with the respective pulleys.

5. The combination with an engine having a fan pulley and drive pulley therefor, of a replacement drive comprising a shaft having reduced and threaded ends, a tube sleeved on said shaft, pairs of metallic cups engaging the threaded portions of said shaft with cups of friction material therebetween, nuts engaging said threaded portions for clamping said metallic cups against said friction cups, brackets secured to said tube, said brackets being fashioned to engage bolts upon the engine casing and to hold said tube and shaft in inclined position with diametrically opposite portions of the friction cups respectively in contact with said pulleys.

6. In an engine, the combination with a fan pulley, a drive pulley therefor, of a shaft extending between said pulleys, and friction wheels at opposite ends of said shaft for engaging the respective pulleys.

7. In an engine, the combination with a fan pulley and a drive pulley therefor, of a shaft arranged between said pulleys, friction cups secured to the opposite ends of said shaft and engaging said pulleys respectively with diametrically opposite portions thereof, whereby both pulleys are revolved in the same direction.

In testimony whereof I affix my signature.

JOHN H. LEITCH.